United States Patent Office 3,108,316
Patented Oct. 29, 1963

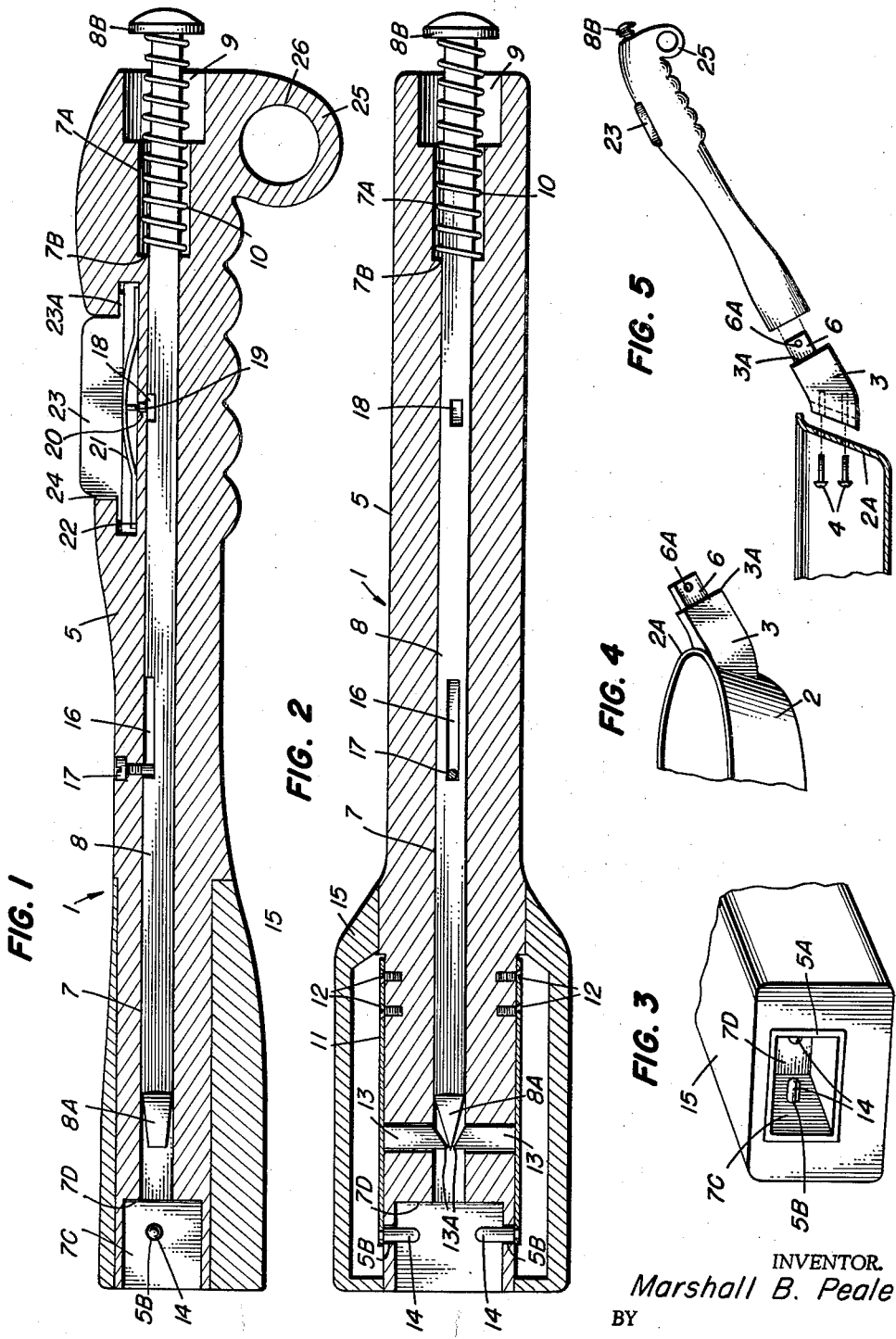

3,108,316
REMOVABLE HANDLE AND RELATED AND OTHERWISE HANDLELESS UTENSILS
Marshall B. Peale, 647 Virginia Ave., Harrisonburg, Va.
Filed Dec. 5, 1961, Ser. No. 157,108
6 Claims. (Cl. 16—114)

My invention relates generally to that type of hand-manipulated utensils or containers which have in common, that they are provided with a manipulating handle which extends outwardly therefrom. More particularly, my present disclosure concerns both the provision of a single handle which removably locks in engagement with any utensil which may be selected from a number of related utensils or containers, which have in common that they are otherwise handleless, and the combination of a single handle with a multiplicity of otherwise handleless containers or utensils. Such utensils may illustratively be provided in a set, as for example, a set of culinary containers.

An object of my invention is to provide a handle which, in simple and direct manner, removably engages in locking relation to a related and otherwise handleless utensil or container, with assurance thereupon being automatically provided, both against relative rotation between handle and utensil and against unintentional release of the related utensil from the grasp of the handle during manipulation of such utensil; which handle is readily produced, involves a minimum number of parts, is sturdy and of long useful life, is low in cost, and which readily lends itself to production in a wide choice of readily available materials of low thermal conductivity.

Another object is to provide a utensil or container for cooperation with a handle of the type just described, which related and otherwise handleless utensil or container is produced for widely diversified service and in a variety of shapes, sizes and configurations. The products being capable of ready production in markedly different manners, as by casting, die-casting, drawing, deep-drawing or the like, they have in common that an external boss is provided on each of them, for receiving the related and removable handle.

Still another object is to provide a new combination of a plurality of separate utensils and containers, perhaps provided in a set, and a single, removable handle cooperating with selected one of said sets, to provide a complete utensil.

Other objects and advantages will in part be obvious and in part more fully pointed out during the course of the following description, considered in the light of the accompanying drawings which form part of this application.

Accordingly, my invention may be considered to reside in the several parts, elements, features and materials of construction, and in the several mechanisms, as well as in the combination of each of the same to and with one or more of the others, the scope of the application of all of which is more fully set forth in the claims at the end of this disclosure.

In the several views of the drawings wherein I disclose that embodiment of my invention which I prefer at present, FIGURES 1 and 2 respectively disclose my new handle in longitudinal vertical section and in longitudinal horizontal section;

FIGURE 3 is a perspective view of the inner, utensil-engaging end of the handle, and discloses the locking fingers which engage in recesses provided in the complemental stud provided on the outer boss of each related utensil;

FIGURE 4 discloses in fragmentary detail, a related utensil or container, otherwise handleless, on the outer surface of which I provide a studded boss for engagement with the removable handle; while FIGURE 5 discloses, on reduced scale and in exploded elevation, the relation of utensil, applied boss and removable handle.

Throughout the several views of the drawings, like reference characters denote like structural parts.

While, for simplicity in illustrating the scope of my invention, I have elected to disclose the same as applied to the ordinary culinary utensil, be the same household or commercial, it is of course to be understood that with equal facility my underlying inventive concept may be readily directed towards many non-culinary applications. And this is so, be the same household, commercial or industrial in concept. Illustrative amongst these several and diversified fields of application may be listed paint containers, water containers as for washing windows, small-size buckets, grease containers, oil cans and the like.

Turning now to the application of my new handle to the culinary art it may be noted that the handle, heretofore generally considered to be indispensible from a practical standpoint in the household culinary utensil, has posed a perplexing limitation in the comfortable usage thereof. Frequently the handles become burned or otherwise damaged. Upon such occurrence, then even in those instances where the damaged handles can be replaced, this is done only with difficulty. Usually, damage to the handle necessitates discarding the entire utensil to scrap. Moreover, the non-metallic material from which the handle is processed, an expedient necessary to reduce thermal conductivity to practical limitation, renders it well nigh impossible to use the modern dishwashing machine to clean the utensil. Additionally, with present-day household construction tending towards the more compact kitchen, storage of the handled utensil becomes a problem of increasing severity, since the utensils cannot with facility be nested upon each other. With utensils positioned on the stove top, their projecting handles frequently get in the way of the housekeeper, giving rise to irritation and aggravation on her part. It sometimes happens that the conveniently-available handle provides an attractive nuisance to the small child, always alert to some new element of interest. Additionally, and not only from the standpoint of the producer, but as well, the shipper, the warehouseman and the retail merchant, additional storage space is sacrificed to the handle.

It has long been recognized that many of these disadvantages would automatically be either removed or avoided were only it possible in some ready, simple and direct manner to make such utensils available on the market without projecting handle, such handles to be both applied and removed only as and when required.

Were only such handle available the problems of space requirement for storage at factory, retail and household levels would become automatically solved. The same would be true as to shipping problems. Damage in transit would be minimized. The dishwashing machine would be available for cleaning purposes. The stove-top area would assume more orderly appearance and availabliity. The housekeeper's problems would be reduced; the hazard to small children in large measure eliminated. Upon damage to handle, only this element of the utensil would require replacement. The utensil itself would be left unaffected. Quite likely the handle would require only repair, rather than complete replacement.

Despite this recognition of deficiency within the art and need for correction thereof, the proposals heretofore made and the constructions heretofore available have, for many diversified reasons, consistently fallen short of fulfilling the requirements of the art, to the extent that they have not received commercial acceptance therein. Either they have been too costly or too complicated, or they have been too fragile and not sufficiently foolproof in service. In some instances application of the handle to or its removal from the utensil has been too complicated and complex for the non-technical housekeeper. With handle applied to utensil, accidental separation of handle from utensil has been observed, with consequent spillage or other accident.

An object of my invention, therefore, is to remove in substantial measure the several practical disadvantages heretofore confronting the art in this general field of application and in so doing, to provide a lockingly removable handle which is certain and virtually foolproof in operation, simple and direct in mode of utilization, uncomplicated both in manufacture and in construction and design, involving only a small number of parts, themselves simple in nature and comparatively readily replaceable upon either failure thereof or damage thereto; and as well, to provide the combination of single handle with related plurality of containers which are otherwise handleless.

And now, having reference to the several views of the disclosure, it will be seen that in the practice of my invention I provide a handle indicated generally at 1. This handle is removably and automatically lockingly engageable with any one of a number of related culinary utensils or containers, indicated generally at 2 (FIGURES 4 and 5). These containers have in common that they are essentially handleless in the sense that they do not have a handle permanently fast thereon. Rather, a boss 3 is provided externally thereon in desired suitable manner. Illustratively, boss 3 may be cast or otherwise formed integrally on container 2. It may be applied thereto in a variety of manners, as by welding, hard-soldering, riveting or the like. Illustratively, and in the embodiment disclosed, I employ two or more metal screws 4 seating through the wall 2A of the utensil 2 into boss 3. This boss 3 has a handle-engaging stud shortly to be described. Such construction has the advantage that should boss 3 become damaged in any manner, it may be readily replaced without discarding the utensil itself. Lost screws can be readily replaced.

Both utensil 2 and boss 3 are formed of metal preferably, though not necessarily, the same metal. So constructed, they may be readily cleaned in any of a variety of recognized and available manners. Illustratively, they stack neatly into the dishwashing machine without damage either to the utensil, the machine or other articles.

The utensils stack readily for storage purposes. They occupy minimum space on the stove top, and the absence of handle assures that they interpose no obstacle interfering with the housekeeper in the conduct of her tasks over the stove.

Consideration of FIGURES 4 and 5 will disclose that I provide shoulder 3A on the outer face of boss 3. There is thus provided a stud 6 extending outwardly from this shouldered face. This stud 6 is preferably formed as an integral part of boss 3, and of the same metal. Its non-circular cross section is here conveniently illustrated as rectangular. On opposite vertical faces thereof I provide recesses 6A for the reception of the related locking pins which I provide in the handle 1, later to be described.

Handle 1 can be readily applied to and removed from utensil 2. Its construction is such that when applied to utensil 2, it is in rigid and non-rotational engagement therewith. Moreover the handle, once engaged to a related utensil, cannot become accidently disengaged during usage, disengagement being possible only under the direct and positive control of the user. This handle can be removed directly, quickly, and positively, as and when required.

With the foregoing requirements in mind, and while the stud 6 may be so constructed as to project substantially horizontally from the utensil, I prefer to direct the same upwardly at an angle of about 35° to 40° to the horizontal. With such an inclination of stud 6, I find that when the related handle is placed downwardly over the stud 6, the vertical component of force thus exerted is sufficient to separate the lock fingers provided in the handle and later to be described, so that the handle automatically and with certainty comes into locking engagement with the related utensil 2. Additionally, this angular relation is such that when the handle mechanism is manipulated in manner to disengage the handle from the utensil, the mass of this utensil is sufficient to hold the utensil on the surface on which it is mounted, illustratively the stove top, while the handle is moved linearly and outwardly away from the stud 6.

It is this handle 1 which cooperates with and is removably and lockingly engageable upon stud 6. Within elongated member 5, part of handle 1, I provide a longitudinal bore 7 which extends centrally through the entire length of member 5. This bore 7 is uniform in cross-sectional dimensions and configuration except for the provision of certain enlargements at the ends thereof. So that the handle mechanism may operate freely, and without hazard of hanging up in bore 7, I provide this bore 7 of continuous cross-sectional configuration, preferably circular.

Intermediate the length of this bore and short of the outer end thereof, I enlarge the diameter thereof to a certain extent, as indicated at 7A. This enlargement receives a coiled spring, to be described. By squaring the corner at the inner end of enlarged bore 7A I provide a peripheral shoulder 7B serving as seat for this coiled spring.

Bore 7 is also enlarged near the inner end of handle 1, as at 7C (FIGURE 1), for the reception of stud 6 on boss 3 of utensil 2. Squaring the corner which defines enlargement 7C in bore 7 provides seat 7D for stud 6 of utensil 2. It is to be noted in this connection that the enlarged inner end of bore 7 is complemental in shape and dimensions to stud 6.

In all instances boss 3 and stud 6 are of identical configuration and dimensioning. This is true for all utensils and containers following the practice of my disclosure.

Rod 8 is freely reciprocable within and along the bore 7. Movements of rod 8 is confined to rectilinear path. To facilitate rectilinear motion, and to prevent rotation, I form rod 8 of noncircular cross-section. Rod 8 terminates at its inner, utensil-adjacent end in a camming surface 8A. Either this camming surface may be truly conical, as in FIGURE 2, or it may comprise two diametrically opposed, plane surfaces as in FIGURE 1. This camming surface 8A cooperates with wedge-like cam followers, to be described.

At its opposite or outer end, cam rod 8 terminates in manipulating button 8B. At its outermost end bore 7A is still further enlarged to shallow depth and to extent sufficiently freely to receive the button 8B when the latter is depressed inwardly to requisite extent. I make button 8B in removably fast manner to the outer end of rod 8. To this end I follow accepted practices, illustratively employing a lock down bolt or screw.

Through this construction, I am enabled to encircle outer end of rod 8 by a loosely encircling coiled spring 10, already referred to. Spring 10 seats at its inner end on shoulder 7B of longitudinal bore 7. At its outer end spring 10 abuts the manipulating button 8B of rod 8. Since spring 10 is normally expansible, it serves to bias rod 8 out of camming relation with the related cam followers, already referred to and later to be described. It is only when the button 8B is manipulated, against the biasing action of spring 10, that the rod 8 is depressed. Thus depressed, rod 8 moves inwardly within bore 7 and into camming position. Futher description will be given hereinafter concerning certain constructional and functional details of cam rod 8.

At inner end of handle 1 and on opposite vertical faces thereof (as considered with handle properly applied to a related utensil) I provide elongated and longitudinally extending spring elements, here shown as single leaf spring elements 11. These spring elements are applied in desired suitable and cantilevered manner to the elongated handle member 5. In the embodiment shown I employ two or more lock-down screws of bolts 12 letting through the leaf springs 11, 11 near their outer ends, and seating into the member 5. These leaf springs 11, 11, disposed in vertical plane, extend longitudinally from their lock-down region along and towards the inner end of handle 1.

Wedge-like cam followers 13, 13 are provided (FIGURE 2), extending inwardly from spring leaves 11, 11 intermediate their length and at right angles thereto, towards but short of the cam surface 8A of rod 8. Each such finger-like cam follower 13 is provided with a wedge-like cam face 13A, cooperating with the camming surface 8A of rod 8. The design, positioning and construction of these cam faces 13A, 13A are such that they are normally out of contact with the camming surface 8A of rod 8. In this connection it will be recalled that this rod is spring-biased outwardly, away from cam followers 13.

Each leaf spring 11, 11 terminates at its inner end, remote from lock-down screws 12, in locking fingers 14, 14. These fingers 14, 14 are either formed on or are applied to the ends of these springs 11. They extend inwardly at approximately right angles to the related spring. It is these fingers 14, 14 which removably and lockingly engage in the recesses 6A, 6A in utensil stud 6 (see FIGURES 4 and 5). To this end, these fingers (see FIGURE 3) extend through ports 5B, 5B (FIGURES 1 and 3) in enlarged head 5B of member 5.

When the handle 1 is applied against stud 6, the sharp outer edges of the stud 6 strike against the rounded inner ends of the lock fingers 14, 14. This action causes the fingers 14, 14 to slide over these sharp edges, and to separate, against the biasing action of the leaf springs 11, 11. This separation of lock fingers 14, 14 permits the handle 1 to move freely downwardly and about the stud 6, until it seats against the shoulder 3A thereof. At this time, the fingers 14, 14 snap into locking engagement in the recesses 6A, 6A of the stud 6. When it is desired to disengage the handle 1 from the related utensil 2, rod 8 is depressed inwardly against spring 10. This is accomplished by depressing button 8B. Rod 8 is thereupon moved inwardly to an extent sufficient for cam surface 8A to engage the cam face of followers 13, 13. Through this action followers 13, 13 are wedged apart. Leaf springs 11, 11 are swung resiliently outwardly. The region of lock-down screws 12 serve as a fulcrum for this action. And of course, the fingers 14, 14 are swung out of engagement with the recesses 6A, 6A of stud 6. The handle 1 can be thereupon readily lifted from the related utensil 2.

From the foregoing it is evident that when rod 8 is pressed inwardly, then by direct and appropriate camming action the spring leaves 11, 11 are automatically separated to an extent such that handle 1 can be readily slipped over the stud 6 of a selected utensil 2. Upon release of button 8B of rod 8 in handle 1, the retractile spring 10 withdraws the rod 8 out of its camming action, so that the spring-carried locking fingers 14, 14 snap into locking engagement in the recesses 6A in the stud 6. The handle is thereupon rigidly locked in place until at such time as the botton 2B is again depressed.

To assure proper rectilinear movement of rod 8 within bore 7 and relative to elongated handle member 5, and as well to guard against unwanted relative rotation in those instances when the cam surface 8A comprises opposed plane faces, I provide a travel-limiting guide slot 16 in the outer surface of the rod 8, intermediate its length. The length of this guide slot 16 determines the length of travel of the rod 8 within bore 7. A cooperating stop means, here shown as a stop lug or screw 17, extends through the wall of the handle member 5. Received within slot 16, this stop 17 engages the terminal walls thereof. This effectively limits length of travel of rod 8.

Where desired, and as best illustrated in FIGURE 2, I provide cover or masking means 15 over each leaf spring 11 and its locking finger 14. While such masking means are not entirely necessary, it serves to improve the appearance of the handle 1. These masking means 15 may be of any desired material, but are preferably formed of the same material as elongated handle member 5. These masking means are applied in any desired and suitable manner.

To remove hazard of unintentional manipulation of rod-depressing button 8B except when intended, I provide a suitable safety lock. As illustrated, this comprises a cooperating lock slot 18 provided in rod 8 intermediate its length together with a related lock finger 19 for reception within lock slot 18. This lock finger extends through a port 20 in the wall of member 5. I provide means for normally retracting finger 19 out of slot 18. With finger 19 so withdrawn, rod 8 is free to reciprocate under the biasing influence of retractile spring 10. To provide this requisite retraction of finger 19, I provide a retractile spring 21 which may be either leaf or coil, here shown, illustratively, as a leaf spring. This spring 21 is provided in a suitable enlarged and shallow recess 22 in handle member 5. A button 23 is received by peripheral flange 23A within the same recess 22 which contains the spring 21. It is by the center of button 23 that contact is made with the spring 21. Button 23 is received within port 24 in handle member 5. I construct this button 23 of size to present such important surface area that it is readily received within the palm of the hand of the user as the latter grasps the same to carry the related and locked utensil. With this action, button 23 serves to depress spring 21 against the normal biasing action of the latter, forcing the locking finger 19 into the lock slot 18 of rod 8. It is then impossible to move rod 8 inwardly into engagement with the cam followers 13, 13. Utensil 2 can not be inadvertently disengaged. It is only when the hand is removed from its normal position for lifting or carrying the handle 1 that the detent 19 unlocks rod 8 freeing the same for longitudinal manipulation. Button 8B can then be depressed against the action of biasing spring 10, to disengage the related utensil 2.

While not entirely necessary to such end, I find it advantageous to provide an enlargement or boss 25 at the under and lower end (FIGURE 1) of handle member 5. And I drill this boss at 26 to provide a finger-receiving bore to serve as a reaction member when thrusting on button 8B to depress the same.

It is apparent from the foregoing that the construction of both the removable handle and of the related boss and stud on the receptacles 2 is simple. The parts are readily produced and assembled. The several elements are both sturdy and of low cost. This is true of the materials of construction themselves. Repairs are seldom required and are easily executed. The handle is readily applied and removed. It is lockingly received in foolproof manner, with hazard of unintentional disengagement effectively avoided. There is no possibility of the handle and utensil to which it is engaged, rotating relative to each other, with consequent loss of contents. As hereinbefore pointed out, utensils can be stored in minimum of space, and may be effectively provided in sets. Damage to handle no longer requires discarding the entire utensil. All that is required is to provide a new handle. The stove top may be maintained uncluttered without danger of spillage through inadvertently knocking against a projecting handle.

All the foregoing, as well as many other highly practical advantages, attend the practice of my invention.

It becomes evident from a consideration of my disclosure that it is entirely within the scope and purview of my invention that, instead of providing projecting boss 3 and related stud 6 on the exterior of the wall of the utensil, I may alternatively provide an interior boss, extending interiorly of the utensil from the wall thereof, with finger-receiving recesses provided laterally along the extent thereof.

It is apparent from the foregoing that once the broad aspects of my invention are disclosed and understood, many modifications of the disclosed embodiment will readily suggest themselves to those skilled in the art, along with other embodiments of the basic concept. Accordingly, I desire the foregoing disclosure to be considered as purely illustrative and not as comprising limitations.

I claim:

1. As a new article of manufacture, a handle for removably locking to a related locking stud on and projecting but a short distance from an otherwise handleless container, which said handle comprises an elongated handle member; stud-opened and stud-engaging locking fingers, spring-mounted on said elongated handle member and normally biased into stud-locking position; unlocking means on said handle member and operable at the will of the user, for disengaging said locking fingers from their locking engagement with the locking stud of the related container; and means actuated by the palm of the hand and operable as an incident to grasping the elongated handle member with the palm overlying the last-mentioned means in intimate contact therewith, in order to manipulate the handle, along with its related container, for locking said unlocking means into its inoperative position, said last-mentioned means relinquishing locking function only upon the user's release of his normal hand grasp around said handle member, with the palm of the hand intimately overlying the last-mentioned means.

2. As a new article of manufacture, a handle for removably locking to a related and projecting locking stud on an otherwise handleless container, which said handle comprises an elongated handle member; stud-opened and stud-engaging locking fingers, spring-mounted on said elongated handle member and biased into stud-locking position; unlocking means on said handle member and operable at the will of the user, for disengaging said locking fingers from their locking engagement with the locking stud of the related container; and means provided intermediate the length of and on that portion of the handle which is topmost when the handle is applied to the related utensil and which means are operable as an incident to pressure applied thereagainst by the palm of the user's hand when the user grasps the elongated handle member in the ordinary manner with the palm overlying the last-mentioned means in intimate contact therewith, for locking said unlocking means into its inoperable position; said last-mentioned means relinquishing its locking function only when the pressure of the palm of the user's hand is relieved, upon and as an incident to his release of his normal hand grasp around said handle member.

3. A lockingly removable handle for a related and otherwise handleless utensil, which said handle comprises an elongated handle member channeled throughout its entire length; locking means provided on the handle member and removably and lockingly engageable in a corresponding part of a related utensil, with which it engages as an incident to application of the handle thereto; means for releasing the locking means as and when desired; and means for locking out said releasing means, said lock-out means being operable as and when desired, and while said handle is attached to the related utensil.

4. A lockingly removable handle for a related and otherwise handleless utensil, which said handle comprises an elongated handle member channeled throughout its entire length; locking means provided on the handle member and removably and lockingly engageable in a corresponding part of a related utensil, with which it engages as an incident to application of the handle thereto; means for releasing the locking means as and when desired; and means operable, as and when desired, and by the hand as an incident to the user grasping said handle for manipulation thereof together with its related utensil, for locking out said releasing means while the handle is being employed to manipulate said related utensil.

5. A device according to claim 4 in which said lock-out means comprises a slot provided in said releasing rod; spring means including a stop pin mounted in said handle member in such relation to said slot that the stop pin, normally biased out of contact with said slot, is depressed therein when the spring member is energized; and an enlarged and palm-operated button for compressing, as an incident to the user grasping the handle in normal manner for manipulating the related utensil, the spring member into lock-out position, with said stop-pin engaged in its related slot.

6. A removable handle for manipulating a related and otherwise handleless utensil which has an outwardly and upwardly extending short handle-receiving stud provided on its upstanding side wall, which said handle comprises an elongated handle member channeled throughout its entire length; a plurality of resilient means disposed longitudinally along and intermediate the length of said handle member near the utensil-adjacent end of said handle member, and being disposed generally opposite to each other, each said resilient means being made resiliently and yieldably fast to said handle member at those ends of said resilient means which are outwardly remote from the related utensil, each said resilient means having spring bias inwardly towards the longitudinal center line of said handle member; locking fingers disposed one on each free end of said each resilient means at the utensil-adjacent ends of said resilient means and extending normally to and inwardly of said resilient means, for removably engaging and locking into and with corresponding recesses provided in the handle-receiving stud of said utensil; releasing fingers disposed normally and inwardly of said resilient means intermediate the length of said resilient means and projecting radially inwardly of said handle member, through lateral bores in the latter, and letting into the longitudinal center bore of said handle member; and camming means comprising a releasing rod reciprocably mounted and linearly movable within the longitudinal channel of said handle member, for camming against said releasing fingers and forcing them apart, thereby forcing the said resilient means, against bias thereof, outwardly from the handle member a distance sufficient to move the locking fingers carried by said resilient means out of engagement with the corresponding recesses provided in said stud on the related utensil, thereby separating the handle from the related utensil.

References Cited in the file of this patent

UNITED STATES PATENTS

| | | |
|---|---|---|
| 261,356 | Joyner | July 18, 1882 |
| 670,854 | Deibel | Mar. 26, 1901 |
| 780,417 | Euphrat | Jan. 17, 1905 |
| 1,068,965 | Boehmler | July 29, 1913 |
| 1,364,552 | Hill | Jan. 4, 1921 |
| 1,481,775 | McKinnis | Jan. 22, 1924 |
| 1,649,387 | Brosi | Nov. 15, 1927 |
| 1,965,354 | Patock | July 3, 1934 |
| 2,442,572 | Sheehan | June 1, 1948 |
| 2,494,159 | Bernstein | Jan. 10, 1950 |
| 2,720,393 | Valentine | Oct. 11, 1955 |
| 2,851,299 | Serio | Sept. 9, 1958 |

FOREIGN PATENTS

| | | |
|---|---|---|
| 603,544 | Great Britain | June 17, 1948 |
| 853,161 | Great Britain | Nov. 2, 1960 |